(12) United States Patent
Kuno et al.

(10) Patent No.: US 9,277,080 B2
(45) Date of Patent: Mar. 1, 2016

(54) IMAGE READING DEVICE DETERMINING WHETHER DARK OUTPUT DATA IS WITHIN PRESCRIBED RANGE

(71) Applicant: BROTHER KOGYO KABUSHIKI KAISHA, Nagoya-shi, Aichi-ken (JP)

(72) Inventors: Takeshi Kuno, Nagoya (JP); Kentaro Sugiyama, Gifu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/500,238

(22) Filed: Sep. 29, 2014

(65) Prior Publication Data

US 2015/0092246 A1 Apr. 2, 2015

(30) Foreign Application Priority Data

Sep. 30, 2013 (JP) ................... 2013-205429

(51) Int. Cl.
  *H04N 1/04* (2006.01)
  *H04N 1/024* (2006.01)
  *H04N 1/00* (2006.01)
  *H04N 1/401* (2006.01)
  *H04N 1/407* (2006.01)

(52) U.S. Cl.
  CPC ....... *H04N 1/02418* (2013.01); *H04N 1/00801* (2013.01); *H04N 1/401* (2013.01); *H04N 1/4076* (2013.01)

(58) Field of Classification Search
  CPC .. H04N 1/00801; H04N 1/401; H04N 1/4076
  USPC ................... 358/3.26, 505, 474, 475, 463
  See application file for complete search history.

(56) References Cited

U.S. PATENT DOCUMENTS 6,191,873 B1   2/2001   Mizoguchi et al.
7,196,725 B1 * 3/2007   Saigusa .................. H04N 1/407
                                                    348/241

FOREIGN PATENT DOCUMENTS

JP      10-164361 A    6/1998
JP      2005-094135 A  4/2005

* cited by examiner

*Primary Examiner* — Houshang Safaipour
(74) *Attorney, Agent, or Firm* — Merchant & Gould P.C.

(57) ABSTRACT

In an image reading device, a storing device stores reference dark output data and reference correction data. A control device, after a command receiving unit receives an instruction to read an original document, generates dark output data based on read data while the light source does not emit light. The control device determines whether the dark output data is within a first prescribed range into which the reference dark output data falls. The control device selects the reference correction data as selected correction data, when determining that the dark output data is within the first prescribed range. The control device generate correction data to correct the image data when determining that the dark output data is not within the first prescribed range, and selects the generated correction data as the selected correction data. The control device corrects the image data by using the selected correction data.

7 Claims, 14 Drawing Sheets

FIG. 14

| DIFFERENCE VALUE Δ1 | DIFFERENCE VALUE Δ3 |
|---|---|
| ⋮ | ⋮ |
| −10 | −8 |
| −8 | −6 |
| −6 | −4 |
| −4 | −2 |
| −2 | −1 |
| 0 | 0 |
| +2 | +1 |
| +4 | +2 |
| +6 | +4 |
| +8 | +6 |
| +10 | +8 |
| ⋮ | ⋮ |

IMAGE READING DEVICE DETERMINING WHETHER DARK OUTPUT DATA IS WITHIN PRESCRIBED RANGE

CROSS REFERENCE TO RELATED APPLICATION

This application claims priority from Japanese Patent Application No. 2013-205429 filed Sep. 30, 2013. The entire content of the priority application is incorporated herein by reference.

TECHNICAL FIELD

The present invention relates to technology which corrects read image data generated by reading an original document.

BACKGROUND

Some image reading devices performs shading correction on read image data which is read from the original document by an image reading unit, in order to suppress difference in performance of the plurality of pixels. In order to execute shading correction, prior to reading the original document, it is necessary to acquire white reference values and black reference values to be used in the shading correction. However, if these values are generated before the original document is read, starting of reading the original document is delayed. For this reason, Japanese Patent Application Publication No. 2005-94135 discloses that the reading of the original document can be started quickly by generating only the white reference data before the original document is read, and using fixed black reference values stored in a storage unit beforehand.

SUMMARY

However, dark output data such as black reference values vary depending on device conditions such as the temperature of the image reading device. For this reason, if fixed values are used irrespective of device conditions, as is done in conventional technology, image reading data that has been read from the original document cannot be properly corrected.

The present invention discloses technology with which the reading of the original document starts quickly, and image data that has been read from the original document is properly corrected as well.

In order to attain the above and other objects, the invention provides an image reading device. The image reading device may include a reading unit, a command receiving unit, a storing device, and a control device. The reading unit may be configured to output image data by reading an original document. The reading unit may have a light source and a light receiving unit. The light source may be configured to emit light. The light receiving unit may be configured to receive light. The command receiving unit may be configured to receive an instruction to control the reading unit to read the original document. The storing device may store reference dark output data and reference correction data assigned with the reference dark output data. The reference dark output data may be generated based on read dark data outputted from the light receiving unit while the light source does not emit light. The control device, after the command receiving unit receives the instruction, may be configured to: generate dark output data based on read data outputted from the light receiving unit while the light source does not emit light; determine whether the dark output data is within a first prescribed range into which the reference dark output data falls; select the reference correction data as selected correction data, when determining that the dark output data is within the first prescribed range; generate correction data to correct the image data when determining that the dark output data is not within the first prescribed range, and select, in place of the reference correction data, the generated correction data as the selected correction data; generate the image data by using the reading unit; and correct the image data by using the selected correction data.

BRIEF DESCRIPTION OF THE DRAWINGS

The particular features and advantages of the invention as well as other objects will become apparent from the following description taken in connection with the accompanying drawings, in which:

FIG. 14 is a difference value table according to the second embodiment.

DETAILED DESCRIPTION

First Embodiment

Figure 1:
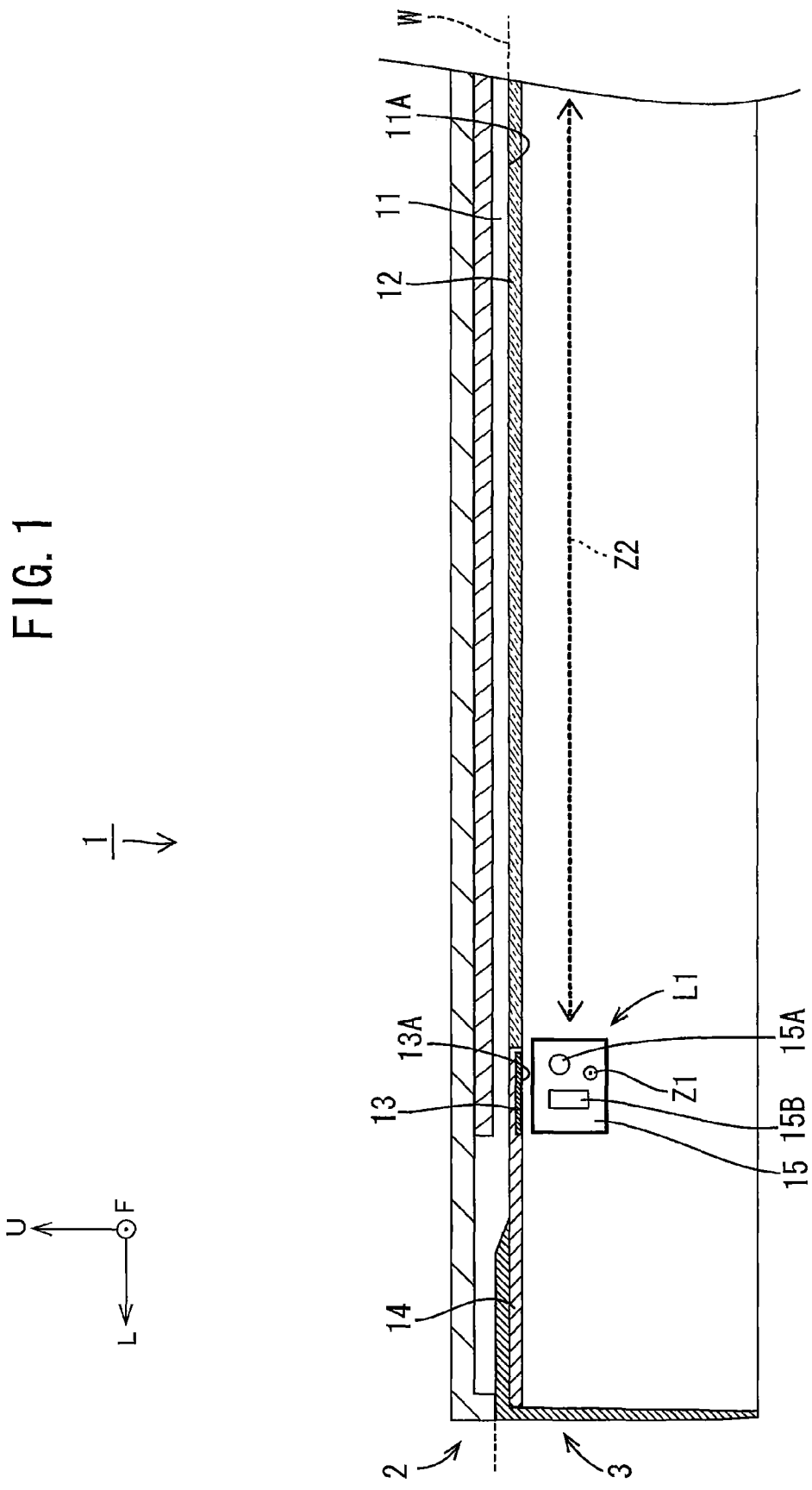
FIG. 1 is a partial cross section of a multifunction peripheral according to a first embodiment.

A multifunction peripheral 1 can execute in multiple modes, such as a scan mode as well as a copy mode, a print mode, etc. The multifunction peripheral 1 is an example of an image reading device. The terms "front (F)", "rear", "right", "left (L)", "upper (U)", "down", "above", "below", "beneath" and the like of the multifunction peripheral 1 will be used throughout the description assuming that the multifunction peripheral 1 is disposed in an orientation in which it is intended to be used. In use, the multifunction peripheral 1 is disposed as shown in FIG. 1. In FIG. 1, the front side (F) of the multifunction peripheral 1 is a near side of the sheet of FIG. 1.

1. Mechanical Structure of the Multifunction Peripheral

As shown in FIG. 1, the multifunction peripheral 1 includes a cover section 2 and a main body 3. A supporting member (not shown), is provided on a rear end side of an upper surface of the main body 3, and the cover section 2 is rotatably supported about this supporting member. As a result, the cover section 2, which is at an upper side of a dotted line W, is displaceable to a covering posture (see FIG. 1) covering the upper surface of the main body 3, and an uncovering posture exposing the upper surface of the main body 3.

The cover section 2 includes a flatbed pressing member 11. The flatbed pressing member 11 is provided at a lower surface side of the cover section 2, and substantially entirely covers a platen glass 12, described below, when the cover section 2 is in the covering posture. The flatbed pressing member 11 has an opposing surface 11A which faces the platen glass 12. Light reflection ratio of the opposing surface 11A is substantially uniform and reflects light represents substantially white color.

The main body 3 as a whole is formed into a box-like shape elongated in a leftward-rightward direction. An upper surface portion of the main body 3 is covered by a frame 14. The platen glass 12 is provided at a central portion of the frame 14. When the multifunction peripheral 1 reads an original sheet, the original sheet is placed onto an upper surface of the platen glass 12. A white reference plate 13 is provided on a lower surface of the frame 14 at a left side of the platen glass 12. The white reference plate 13 is a white member and has an opposing surface 13A opposing a reading unit 15, described below. The opposing surface 13A is configured to have a specific light reflection rate. The white reference plate 13 is an example of a reference member.

Figure 2:
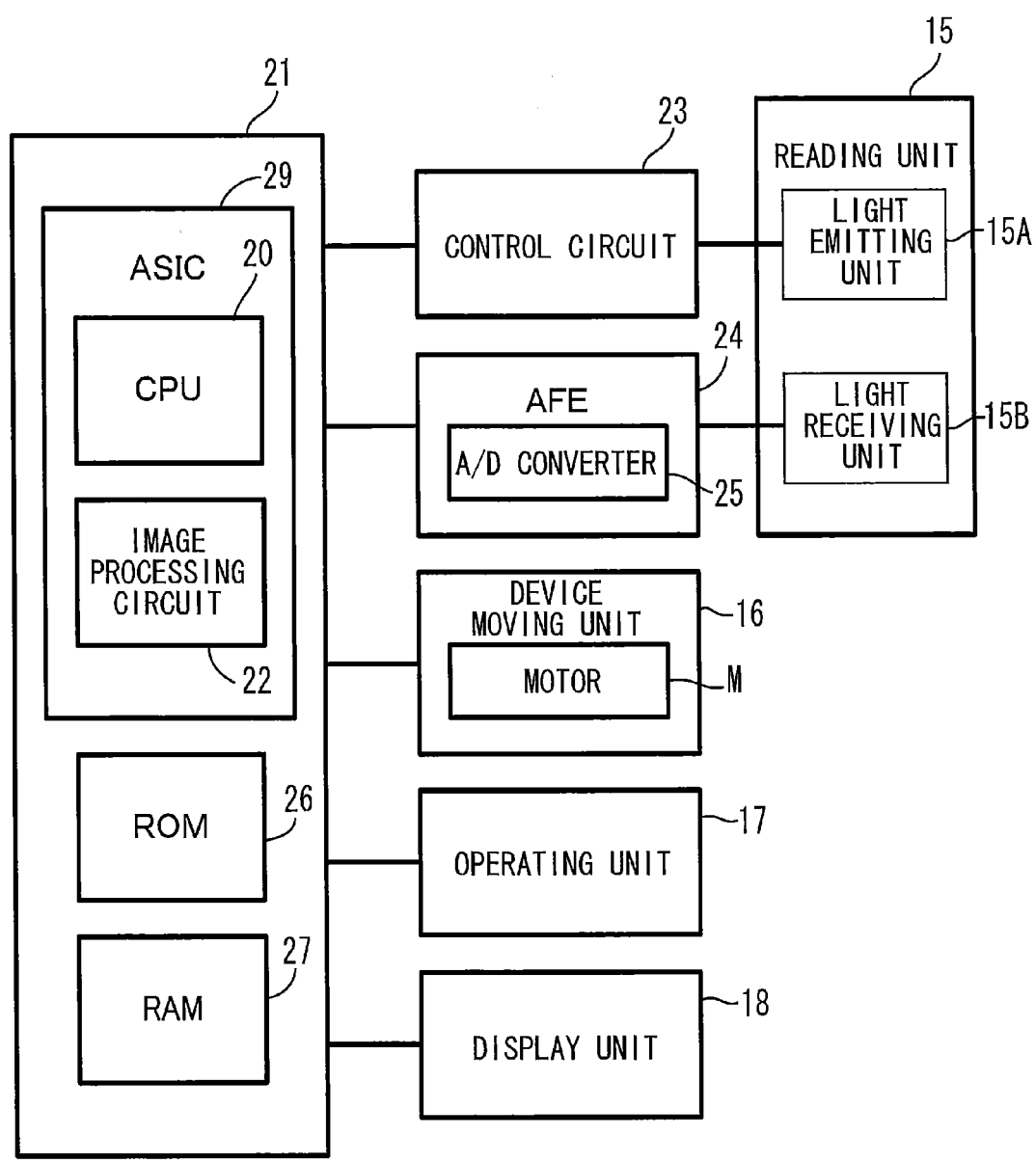
FIG. 2 is a block diagram illustrating electrical structures of the multifunction peripheral.

The main body 3 further includes the reading unit 15 and a device-moving unit 16 (see FIG. 2). As shown in FIG. 1, the reading unit 15 remains normally stationary at a reference location L1 in opposition to the white reference plate 13. The reading unit 15 is a reading device which has a contact image sensor (CIS) having a light emitting part 15A and a light receiving part 15B. The light emitting part 15A is an example of a light source, and the reading unit 15 is an example of an image reading unit.

The light emitting part 15A includes multiple light emitting element (such as light emitting diodes). The multiple light emitting elements are arranged in a main scanning direction Z1 parallel to a front-rear direction of the main body 3. The light receiving part 15B multiple sensor chips SC (see FIG. 9). The multiple sensor chips SC are arranged in the main scanning direction Z1. Each sensor chip SC has multiple light receiving elements arranged in the main scanning direction Z1. The light receiving part 15B, utilizing the light receiving elements, receives light which has been emitted from the light emitting part 15A and reflected by the original sheet, thereby reading in the original sheet. In addition, the light receiving part 15B utilizes the light receiving elements to receive light which has been irradiated from the light emitting part 15A and reflected by the white reference plate 13, thereby reading in the white reference plate 13. Each sensor chip SC corresponds to one pixel of read image data.

The device-moving unit 16 is capable of moving the reading unit 15 at a lower side of the platen glass 12, in a subscanning direction Z2 parallel to the left-right direction of the main body 3, i.e. perpendicular to the main scanning direction Z1. The device-moving unit 16 has a motor M (see FIG. 2) that rotates a movement roller (not shown) and thereby moving the reading unit 15 in the subscanning direction Z2.

The reading unit 15 reads the white reference plate 13 at the reference location L1. In addition, the reading unit 15 executes so-called flatbed reading, reading a lower surface of the original sheet placed on the upper surface of the platen glass 12 while moving in the subscanning direction Z2 below the lower side of the platen glass 12.

2. Electrical Structure of the Multifunction Peripheral

As shown in FIG. 2, the multifunction peripheral 1 includes a control section 21, a control circuit 23, and an analog front end (hereafter, AFE) 24. The control section has an application-specific integrated circuit (hereafter, ASIC) 29, a ROM 26, and a RAM 27. Each element of the control section 21 is connected to the control circuit 23, the AFE 24, the reading unit 15, and the device-moving unit 16. The control section 21 is an example of a control device. The RAM 27 is an example of a storage unit.

The ASIC 29 includes a CPU 20, as well as special-purpose hardware circuits such as an image processing circuit 22. Various programs for controlling operation of the multifunction peripheral 1 are stored in the ROM 26. The CPU 20 controls components in accordance with programs read out from the ROM 26, and as necessary utilizes hardware circuits to execute processing such as image reading process, described below. Values such as a prescribed minimum value LK, a prescribed maximum value HK, error determination values EMAX and EMIN, a threshold UK, and a difference value table H are also stored in the ROM 26.

The control circuit 23 is connected to the reading unit 15, and transmits read control signals based on commands from the CPU 20. Based on read control signals from the control circuit 23, the reading unit 15 determines a light emitting period for the light emitting part 15A while reading the original sheet and the white reference plate 13, and controls the light emitting part 15A to emit light based on this determination. Incidentally, the light emitting periods determined based on the read control signal may include "light emitting period=0", indicating that the light emitting part 15A does not emit light. The light emitting period is an example of an emitting period.

For a single emission of light from the light emitting part 15A, the reading unit 15 performs a single read of the original sheet and the white reference plate 13. In a single read, the light receiving part 15B reads one line in the main scanning direction Z1, and obtains read image data, which is a collection of image data obtained by the light receiving elements arranged in the main scanning direction Z1. The read image data obtained by the reading unit 15 is transmitted to the AFE 24.

The AFE 24 has an analog/digital converter 25. The AFE 24 converts read image data in an analog signal obtained by the reading unit 15 (light receiving part 15B) into read image data in a digital signal, and transmits the digital signal to the ASIC 29. The image processing circuit 22 executes shading correction on the read image data in the digital signal, and stores, in the RAM 27, the read image data on which the shading correction is performed.

The multifunction peripheral 1 further includes an operating unit 17 and a display unit 18. The operating unit 17 consists of various configuration buttons, and accepts various commands from users. The display unit 18 includes an LED and liquid crystal display, and displays status information related to the multifunction peripheral 1. The operating unit 17 is an example of a receiving unit.

3. Image Reading Process (Image Reading Process)

Figure 3:
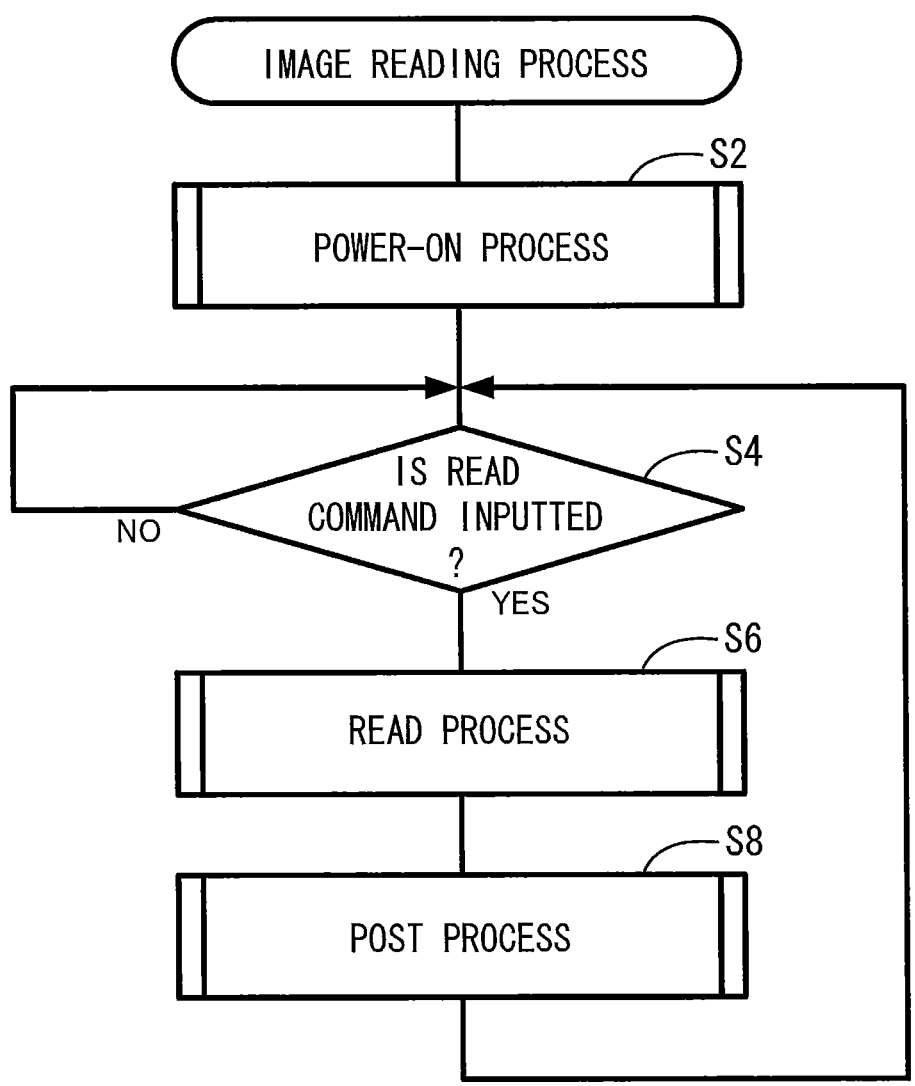
FIG. 3 is a flowchart illustrating an image reading process according to the first embodiment.

Next, image reading process of the multifunction peripheral 1 will be described with reference to FIGS. 3 to 10. When power to the multifunction peripheral 1 is turned on by a user (that is, the control section 21 is booted up), the CPU 20 executes image reading process. As shown in FIG. 3, upon starting to perform image reading process, in S2 the CPU 20 first executes power-on process.

(Power-on Process)

Figure 4:
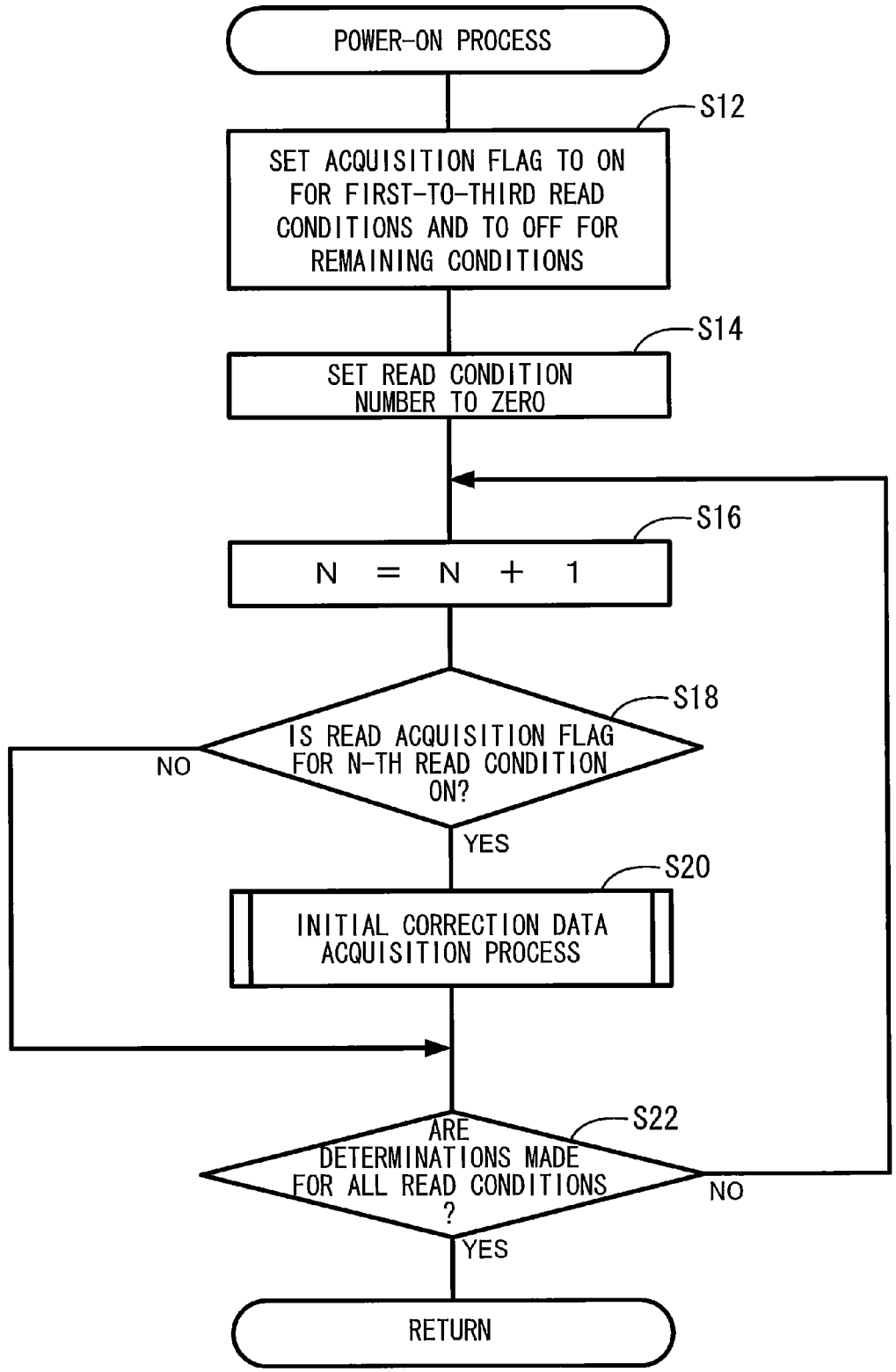
FIG. 4 is a flowchart illustrating a power-on process according to the first embodiment.

As shown in FIG. 4, in the power-on process, the CPU 20 first selects three read conditions from among read conditions stored beforehand in the ROM 26. Here, "read conditions" signifies a set of conditions related to the reading of the original sheet, and more specifically includes, for example, a resolution condition and a monochrome/color condition. In S12, the CPU 20 selects, from among multiple read conditions that can be selected on the multifunction peripheral 1, the three read conditions supposed to be selected most frequently by users, sets acquisition flags for the three selected read conditions to ON, and sets the acquisition flags for the other read conditions to OFF.

Here, the acquisition flags indicate whether or not to execute an initial correction data acquisition process, described below, and which are specified for each of the respective read conditions. As described below, the CPU 20 executes initial correction data acquisition process for read conditions whose acquisition flags are set to ON, and does not execute the initial correction data acquisition process for read conditions whose acquisition flags are set to OFF.

The read conditions supposed to be selected most frequently by the users may be previously specified by data stored in the ROM 26. The multifunction peripheral 1 may count the number of times that the each reading condition has been selected from the user from initial use of the multifunction peripheral 1 until the present time, and select the read conditions supposed to be most frequently selected by the users based on the counted number of times. In the embodiment, first, second, and third read conditions, shown below, have been selected.

First read condition: resolution condition=300 dpi, monochrome/color condition=monochrome Second read condition: resolution condition=600 dpi, monochrome/color condition=monochrome Third read condition: resolution condition=300 dpi, monochrome/color condition=color In S14, the CPU 20 initializes a read condition number N, that is, sets the read condition N to zero. In S16, the CPU 20 increments the read condition number N by 1. In S18, the CPU 20 then determines whether or not the acquisition flag for the N-th read condition is ON. If the acquisition flag for the N-th read condition is ON (S18: YES), in S20 the CPU 20 executes an initial correction data acquisition process.
(Initial Correction Data Acquisition Process)

Figure 5:
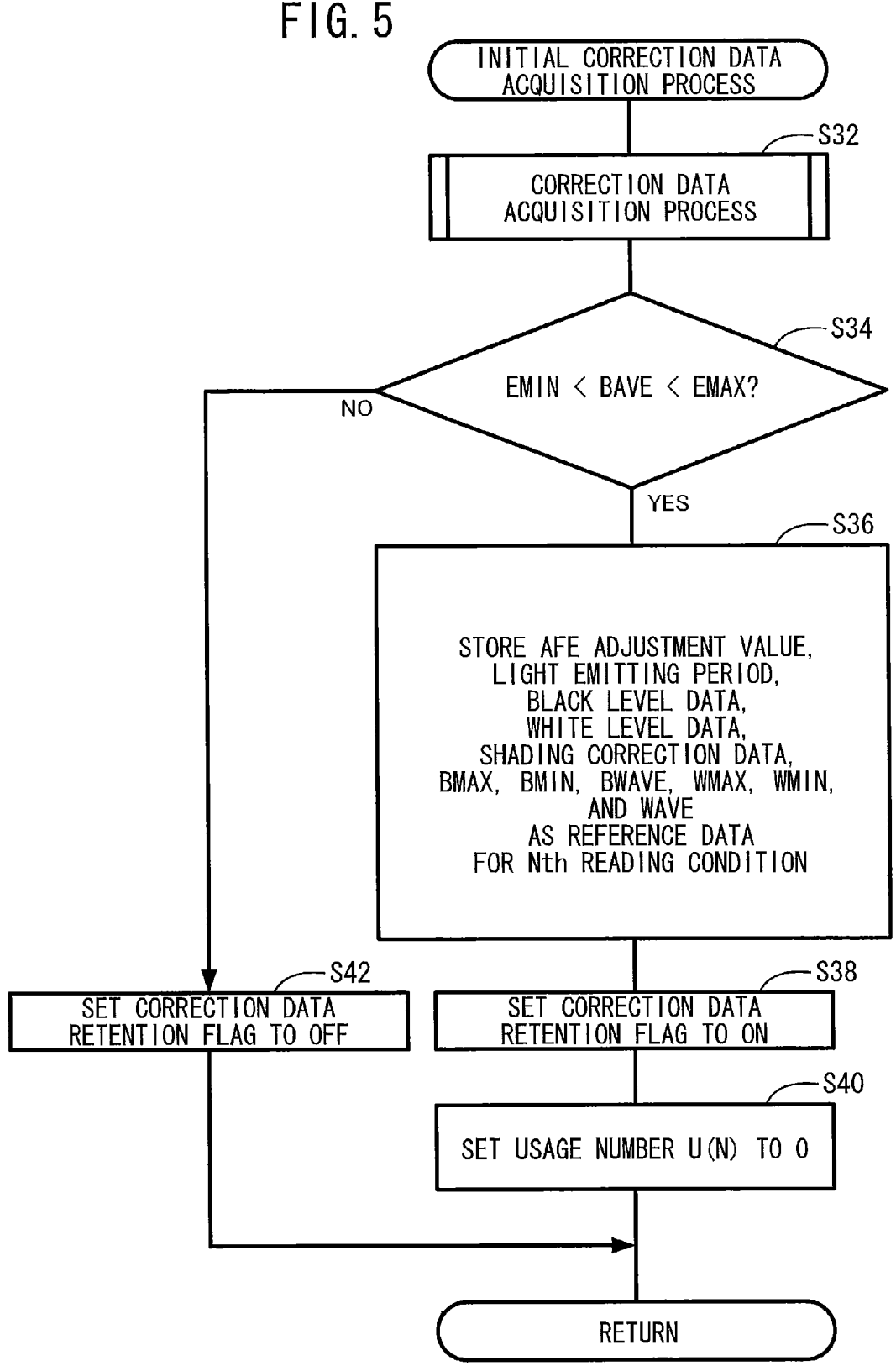
FIG. 5 is a flowchart illustrating an initial correction data acquisition process according to the first embodiment.

As shown in FIG. 5, in S32 of the initial correction data acquisition process, the CPU 20 first executes a correction data acquisition process.
(Correction Data Acquisition Process)

Figure 6:
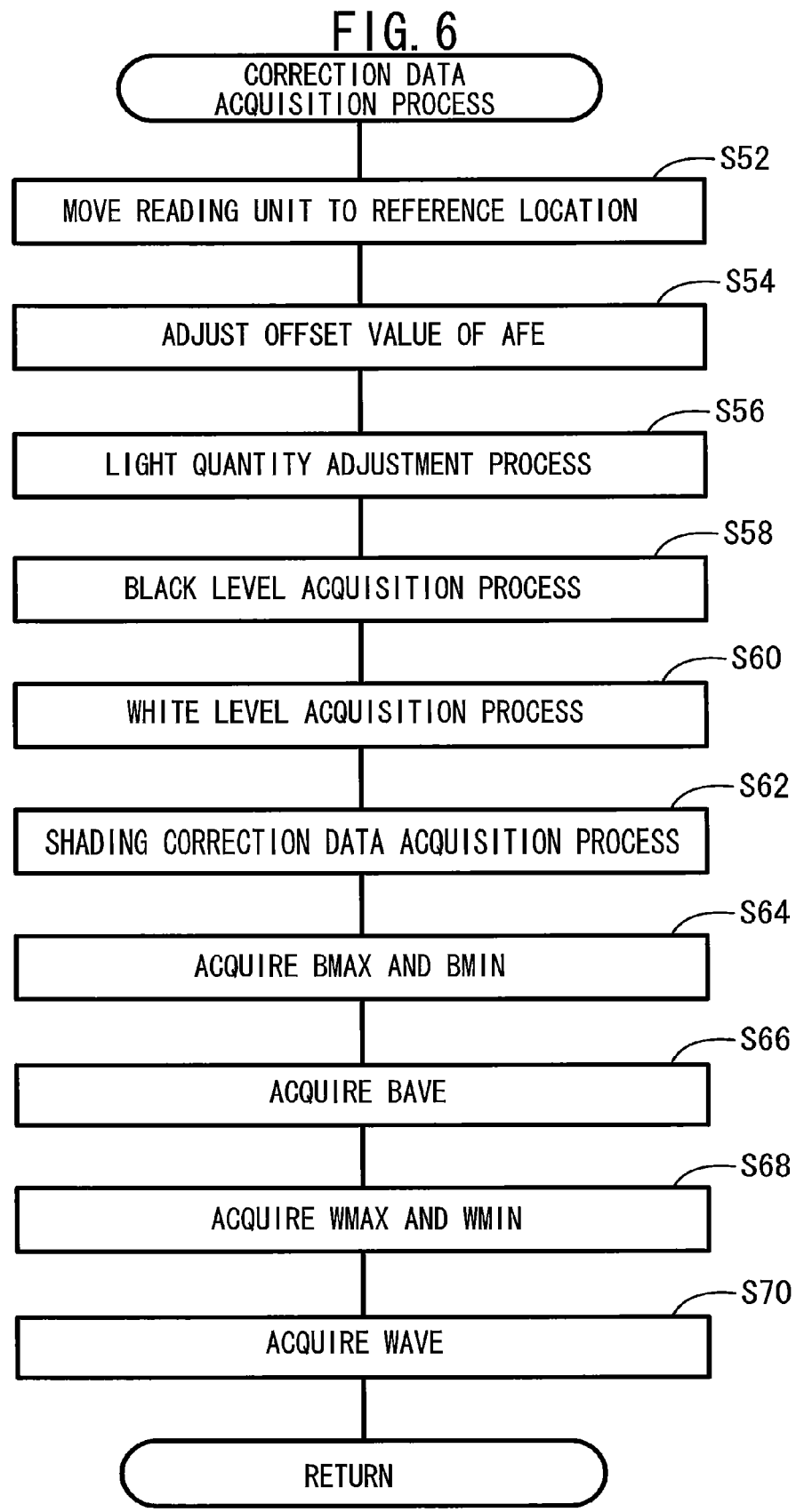
FIG. 6 is a flowchart illustrating a correction data acquisition process according to the first embodiment.

As shown in FIG. 6, in S52 of the correction data acquisition process, the CPU 20 controls the device-moving unit 16 to move the reading unit 15 to the reference location L1. If the reading unit 15 is stationary at the reference location L1, the processing in S52 is not necessary required.

Next, in S54 the CPU 20 executes an AFE adjustment process. In the AFE adjustment process, an offset value of the AFE 24 is adjusted. Here, the offset value of the AFE 24 serves as a reference for input range specification. Specifically, the CPU 20 controls the reading unit 15 to acquire read image data in an analog signal while the light emitting part 15A is not emitting light. The CPU 20 controls the analog/signal converter 25 to convert the read image in the analog signal into read image in the digital signal. When the analog/signal converter 25 converts the read image from the analog signal to the digital signal, the CPU 20 adjusts the offset value of the AFE 24 such that a minimum value of the converted read image data in the digital signal is set to a prescribed minimum value LK, as indicated by a solid line on a lower section of FIG. 9.

Next, in S56, the CPU 20 executes a light quantity adjustment process. In the light quantity adjustment process, a light emitting period is adjusted. Here, during the light emitting period the light emitting part 15A emits light. The light emitting period is a reference period when the original sheet and the white reference plate 13 are read. Specifically, as indicated by a solid line in an upper section of FIG. 9, the CPU 20 controls the reading unit 15 to acquire read image data with the light emitting part 15A emitting light, the analog/digital converter 25 converts this read image data into a digital signal. When the analog/signal converter 25 converts the read image from the analog signal to the digital signal, the CPU 20 adjusts the light emitting period by extending or decreasing the light emitting period such that a maximum value in the converted read image data in the digital signal becomes a prescribed maximum value HK.

Next, in S58 the CPU 20 executes a black level acquisition process. In the black level acquisition process, the CPU 20 performs read operations X times (X is a natural number greater than or equal to two) without emitting light from the light emitting part 15A. The CPU 20 averages the X collections of read data (values) obtained by the X-times read operations for each light reception element and acquires the averaged read data (values) as read image data for each light reception element. The CPU 20 controls the analog/digital converter 25 to convert this read image data utilizing the offset value adjusted in the AFE adjustment process (hereinafter, referred to as a reference AFE adjustment value), and acquires the read image data converted into the digital signal as black level data.

Next, in S60 the CPU 20 executes a white level acquisition process. In the white level acquisition process, the CPU 20 performs read operations X times while the light emitting part 15A emits light during the light emitting period adjusted in the light quantity adjustment process. The CPU 20 averages the X collections of read data (values) obtained by the X-times read operations for each light reception element and acquires the averaged read data (values) as read image data for each light reception element. The CPU 20 controls the analog/digital converter 25 to convert this read image data utilizing the reference AFE adjustment value, and acquires the read image data converted into the digital signal as white level data.

Next, in S62 the CPU 20 executes a shading correction data acquisition process. In the shading correction data acquisition process, the CPU 20 acquires shading correction data using the black level data acquired in the black level acquisition process and the white level data acquired in the white level acquisition process, based on known methods.

Upon acquiring this shading correction data, in S64 the CPU 20 specifies maximum and minimum values for the black level data acquired by the respective light emitting elements in the black level acquisition process and acquires the specified maximum and minimum values for the black level data as black level determination values BMAX and BMIN, respectively. Further, in S66 the CPU 20 acquires an average value for the black level data of the all light emitting elements, as a black level average value BAVE.

In the same way, in S68 the CPU 20 specifies maximum and minimum values for the white level data acquired by the respective light emitting elements in the white level acquisition process and acquires the specified maximum and minimum values for the white level data as white level determination values WMAX and WMIN, respectively. Further, in S70 the CPU 20 acquires an average value for the white level data of the all light emitting elements, as a white level average value WAVE.

(Initial Correction Data Acquisition Process)

Upon ending the correction data acquisition process, the CPU 20 returns to the initial correction data acquisition process shown in FIG. 5. In S34 the CPU 20 determines whether or not sets of data acquired during correction data acquisition process are erroneous. Specifically, the CPU 20 compares the black level average value BAVE acquired in the correction data acquisition process with the error determination values EMAX and EMIN stored beforehand in the ROM 26. That is, the CPU 20 determines whether the black level average value BAVE is between the error determination values EMAX and EMIN.

Here, the error determination value EMAX is an upper error threshold value of the black level average value BAVE. If, for example, the covering section 2 of the main body 3 is in the uncovering posture, and external light from this opening-closing part is received by the light receiving part 15B, the black level average value BAVE will rise to a value which is greater than or equal to the error determination value EMAX. Meanwhile, the error determination value EMIN is a lower error threshold of the black level average value BAVE. If, for example, any of the light receiving elements of the light receiving part 15B become damaged, and an OFF signal is outputted from the broken light receiving elements, the black level average value BAVE will drop to a value which is less than or equal to the error determination value EMIN. According to the embodiment, the value of the error determination value EMAX is set based on whether or not external light has been received. However, in the present invention the error determination value EMAX may be set to a value that is determined to be erroneous as a value that the light receiving part 15B outputs.

If the black level average value BAVE of the black level data is less than the error determination value EMAX and greater than the error determination value EMIN (S34:YES), in S36 the CPU 20 determines that each sets of data acquired in the correction data acquisition process is correct, and stores these sets of data in the RAM 27 as reference data for the N-th read condition. For example, the CPU 20 stores the black level average value BAVE acquired in the correction data acquisition process as reference black level average value BAVE for the N-th read condition. The CPU 20 also stores the shading correction data acquired in the correction data acquisition process as reference shading correction data for the N-th read condition. Further, the CPU 20 stores the AFE adjustment value, the light emitting period, the black level data, the white level data, the black level determination values BMAX, BMIN, the white level determination value WMAX, WMIN, and the white level average value WAVE. As described above, each values (data) are linked to the N-th read condition in the RAM 27. As a result, the each sets of data acquired in the correction data acquisition process are linked to one another. Hereinafter, the values and data stored in the RAM 27 as the reference data are referred to as reference values and reference data, such as, the reference black level determination values BMAX and BMIN, and the reference white level data.

Upon storing the reference data for the N-th read condition in the RAM 27, in S38 the CPU 20 sets a correction data retention flag to ON, in S40 initializes a usage number U(N) to zero, and ends the initial correction data acquisition process. The usage number U(N) indicates the number of times that the reference shading correction data for the N-th read condition has been used. The usage number U(N) is an example of a selection number.

Here, the correction data retention flag indicates whether or not to retain reference data such as the reference shading correction data stored in the RAM 27, and is set for each read condition whose acquisition flag is ON. As described below, for read conditions whose correction data retention flag is ON, the CPU 20 retains the reference data stored in the RAM 27 whereas for read conditions whose data retention flag is OFF, the CPU 20 executes the correction data acquisition process again and overwrites the reference data stored in the RAM 27 with the newly acquired reference shading correction data.

On the other hand, if the black level average value BAVE for the black level data is greater than or equal to the error determination value EMAX or is less than or equal to the error determination value EMIN (S34:NO), in S42 the CPU 20 determines that at least one set of data acquired in the correction data acquisition process include error. In this case, the CPU 20 sets the correction data retention flag for the N-th read condition to OFF and does not stores these sets of data in the RAM 27, and ends initial correction data acquisition process.

(Power-on Process)

Upon ending the initial correction data acquisition process, the CPU 20 returns to the power-on process shown in FIG. 4. In the power-on process, if the acquisition flag for the N-th read condition is OFF (S18:NO), the CPU 20 does not execute the initial correction data acquisition process. If the initial correction data acquisition process has ended, or the acquisition flag for the N-th read condition is OFF, in S22 the CPU 20 determines whether or not a decision (S18) has been made with respect to the acquisition flag for all of the read conditions. If there are any read condition having an acquisition flag to which a decision has not been made (S22:NO), the CPU 20 repeats process starting from S16. If a decision has been made with respect to the acquisition flag for all of the read conditions (S22:YES), the CPU 20 ends power-on process.

(Image Reading Process)

Upon ending the power-on process, the CPU 20 returns to the image reading process shown in FIG. 3, and waits for a read command to be inputted by a user (S4: NO). When an original sheet has been placed on the upper surface of the platen glass 12 by a user, and a read command specifying a read condition has been inputted via the operating unit 17 (S4:YES), in S6 the CPU 20 executes a read process. In the embodiment, the read command specifies an NA-th read condition as an example.

(Read Process)

Figure 7:
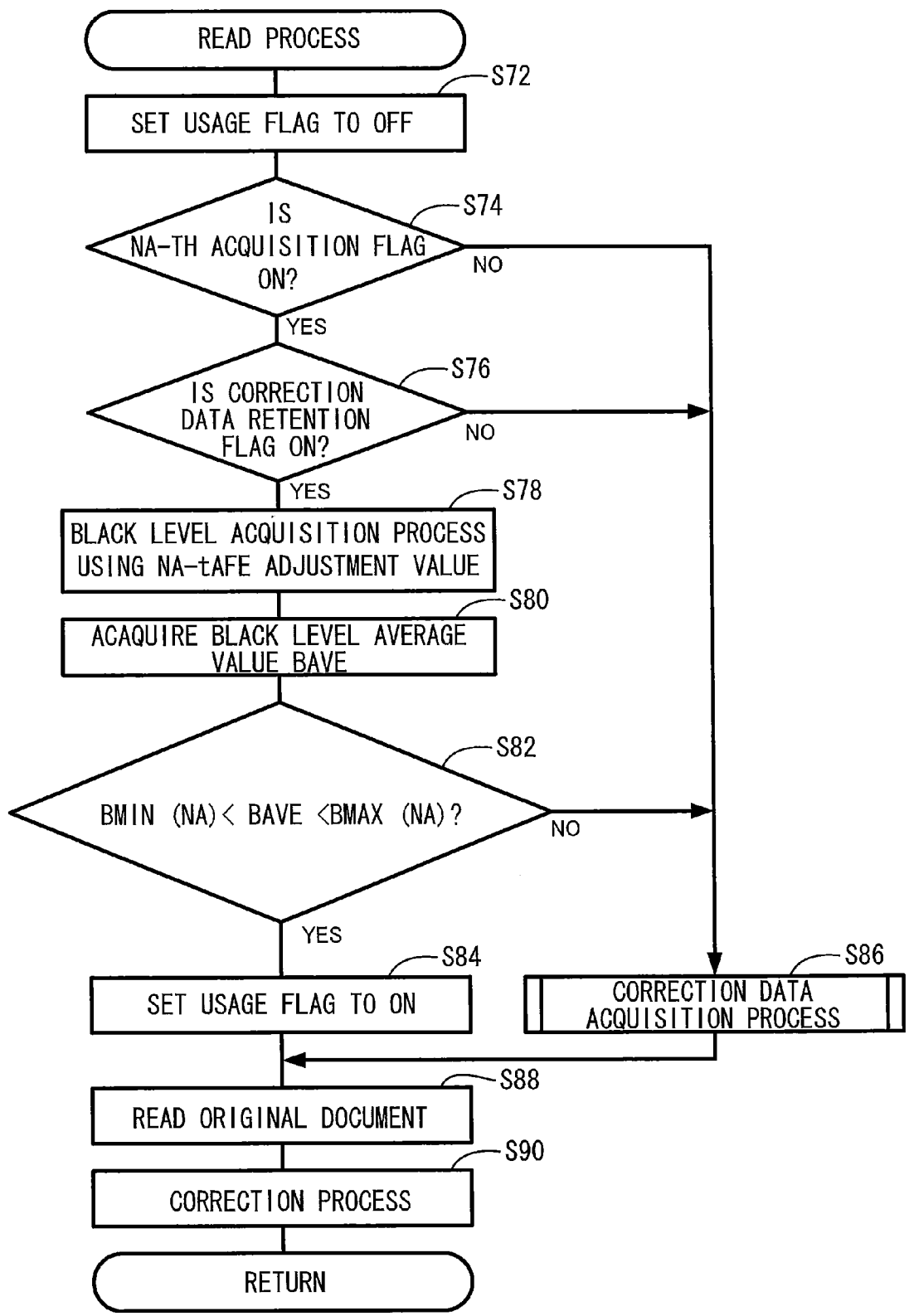
FIG. 7 is a flowchart illustrating a read process according to the first embodiment.

As shown in FIG. 7, at the beginning of the read process, in S72 the CPU 20 sets the usage flag to OFF. Here, the usage flag indicates whether or not to use the reference shading correction data stored in the RAM 27. If, as described below, the reference shading correction data stored in the RAM 27 is to be used, the CPU 20 switches the usage flag to ON. If the correction data acquisition process is to be executed again and the reference shading correction data acquired in that correction data acquisition process is to be used, the CPU 20 keeps the usage flag OFF.

Next, in S74 the CPU 20 determines whether or not the acquisition flag for an NA-th read condition specified in the read command is ON. If this acquisition flag is ON (S74: YES), in S76 the CPU 20 also determines whether or not the correction data retention flag for the NA-th read condition is ON. If the correction data retention flag for the NA-th read condition is ON (S76:YES), in S78 the CPU 20 executes a black level acquisition process using the reference AFE adjustment value stored in the RAM 27 linked to the NA-th read condition, and in S80 acquires the black level average value BAVE from the acquired black level data.

In the black level acquisition process in S78, read operations without emitting light from the light emitting part 15A are performed Y times, and black level data is acquired using the reference AFE adjustment value. In S80 the CPU 20 averages the Y collections of read data (values) obtained by the Y-times read operations for each light reception element and acquires the averaged read data (values) as read image data for each light reception element. The CPU 20 controls the analog/digital converter 25 to convert this read image data utilizing the offset value adjusted in the AFE adjustment process, and acquires the read image data converted into the digital signal as black level data. Finally, the CPU 20 acquires an average for the black level data of all light emitting elements as a black level average value BAVE. The number "Y" is set to a value which is lower than the value of the number "X" used in S58. Upon acquiring the black level average value BAVE, in S82 the CPU 20 determines whether or not the acquired black level average value BAVE matches, within a prescribed range, the reference black level average value BAVE stored in the RAM 27 linked to the NA-th read condition. In other words, the CPU 20 determines whether the black level average value BAVE is between the reference black level determination values BMAX and BMIN. That is, the CPU 20 determines whether the black level average value BAVE is a range from the value BMIN to the value BMIN. Here, the reference black level average value BAVE falls in this range.

Figure 10:
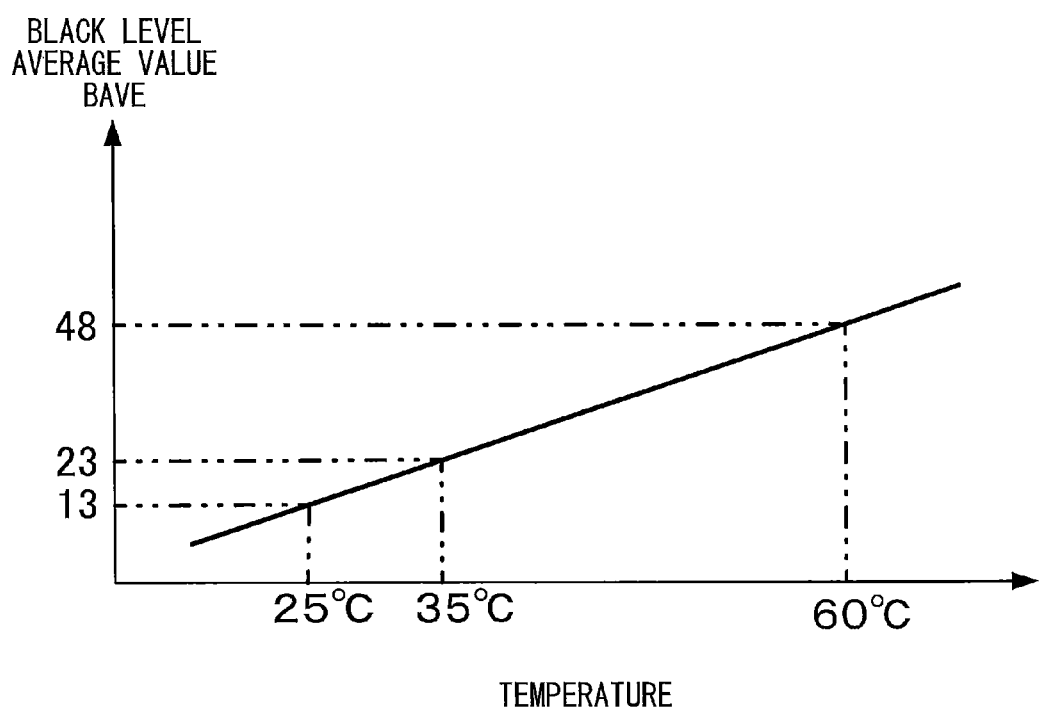
FIG. 10 is a graph showing temperature characteristics of a black level average value.

The inventors carried out extensive experimentation and research on the black level data acquired in the black level acquisition process, and discovered that the black level data varied depending on the temperature of the reading unit 15, and in particular on the temperature of the light receiving part 15B of the reading unit 15. In FIG. 10, the black level data increases proportionally to rising temperature of the light receiving part 15B, as indicated the black level average value BAVE, which is a representative value of the black level data. In addition, as the black level average value BAVE increases, the shading correction data calculated from the black level data changes as well.

For this reason, if the black level average value BAVE acquired in S80 does not match, within the prescribed range, the reference black level average value BAVE stored in the RAM 27, it will not be possible to properly correct the read data by executing the shading correction using the reference shading correction data stored in the RAM 27 linked to the reference black level average value BAVE. In the embodiment, prior to the correction process (S90) in which the shading correction is executed, the CPU 20 determines whether or not the black level average value BAVE acquired in S80 matches, within the prescribed range, the reference black level average value BAVE stored in the RAM 27, and thereby determines whether or not the reference shading correction data stored in the RAM 27 in the correction processing can be used.

Specifically, the CPU 20 compares the black level average value BAVE acquired in S80 with the reference black level determination values BMAX and BMIN, and if the black level average value BAVE acquired in S80 is less than the reference black level determination value BMAX and greater than the reference black level determination value BMIN (S82:YES), the CPU 20 determines that the black level average value BAVE acquired in S80 matches, within the prescribed range, the reference black level average value BAVE stored in the RAM 27, and in S84 the CPU 20 switches the usage flag to ON.

Meanwhile, if the acquisition flag for the NA-th read condition specified in the read command is OFF (S74:NO), or if the correction data retention flag for the NA-th read condition is OFF (S76:NO), or if the black level average value BAVE acquired in S80 is greater than or equal to the reference black level determination value BMAX or is less than or equal to the reference black level determination value BMIN (S82:NO), in S86 the CPU 20 executes a correction data acquisition process again. The process in S86 is the same as the process in S32, so a duplicate explanation is omitted.

If in S84 the CPU 20 switches the usage flag to ON or in S86 executes correction data acquisition process, in S88 the CPU 20 reads the original document. In reading the original document, the CPU 20 instructs the device-moving unit 16 to move the reading unit 15 such that the reading unit 15 moves in the subscanning direction Z2. At the same time, the CPU 20 instructs the reading unit 15 to perform read operations repeatedly. Accordingly, the reading unit 15 repeats the read operations. In this way, original document image data is acquired by arranging sets of read image data in the subscanning direction Z2, and the entire area of the original sheet placed on the upper surface of the platen glass 12 can be read.

Next, in S90 the CPU 20 executes the correction process in which shading correction is performed on the original document image data. If the usage flag is ON, the CPU 20 executes the shading correction using the reference shading correction data stored in the RAM 27. On the other hand, If the usage flag is OFF, the CPU 20 executes the shading correction using the shading correction data acquired in the correction data acquisition process in S86. Here, correction process is executed sequentially each time read image data is acquired while reading the original document. After ending correction process, the CPU 20 ends the read process.

(Image Reading Process)

Upon ending the read process, the CPU 20 returns to the image reading process shown in FIG. 3. In S8, the CPU 20 executes a post process after the read process.

(Post Process)

Figure 8:
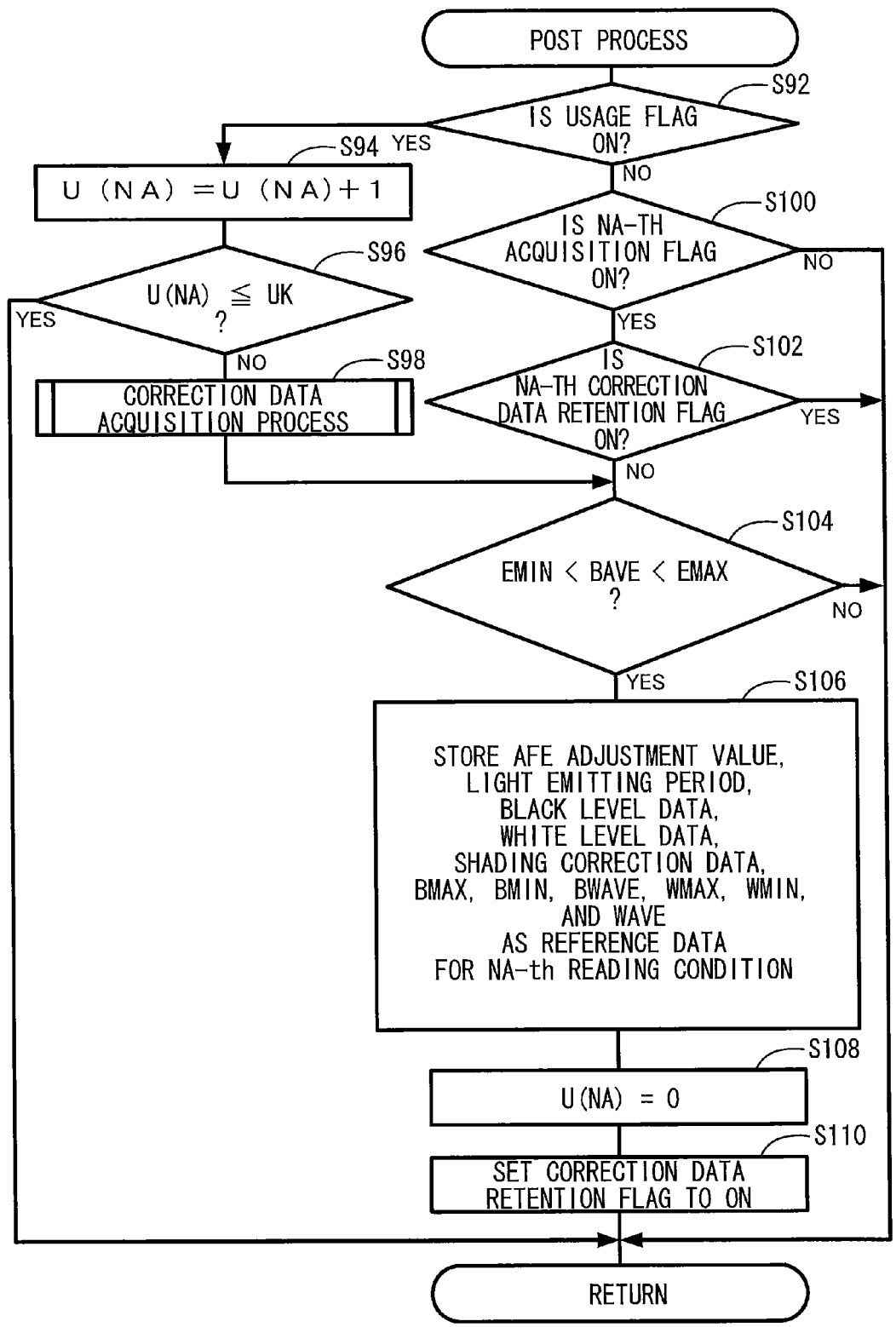
FIG. 8 is a flowchart illustrating a post process according to the first embodiment.

As shown in FIG. 8, in S92 of the post process, the CPU 20 determines whether or not the usage flag is ON. If the usage flag is ON (S92:YES), in S94 the CPU 20 increments a usage number U(NA) for the NA-th read condition by one. In S96 the CPU 20 compares the incremented usage number U(NA) with a threshold UK stored beforehand in the ROM 26, and if the usage number U(NA) is less than or equal to the threshold UK (S96:YES), the CPU 20 ends post process.

On the other hand, if the usage number U(NA) is greater than the threshold UK (S96:NO), in S98 the CPU 20 again executes the correction data acquisition process and acquires the reference data for the NA-th read condition. The correction data acquisition process in S98 is the same as the process in S32, so a duplicate explanation is omitted. If the usage number U(NA) is greater than the threshold UK, a relatively long period, corresponding to the threshold UK, will have passed since the reference data for the NA-th read condition was stored in the RAM 27. For this reason there is a possibility that, due to the aged deterioration of the light emitting part 15A, the reference data stored in the RAM 27 for the NA-th read condition, such as the reference white level data and the reference shading correction data, will not adapt the present state of the multifunction peripheral 1. In this case, the correction data acquisition process is executed again in order to reduce the influence of the aged deterioration on the light emitting part 15A.

In addition, if the usage flag is OFF (S92:NO), in S100 the CPU 20 determines whether or not the acquisition flag for the NA-th read condition specified in the read command is ON. If this acquisition flag is ON (S100:YES), in S102 the CPU 20 also determines whether or not the correction data retention flag for the NA-th read condition is ON.

If the correction data acquisition process has been performed in S98 or the correction data retention flag for the NA-th read condition is OFF (S102:NO), the CPU 20 compares the black level average value BAVE (acquired in either S98 or S86) to the error determination values EMAX and EMIN. That is, the CPU 20 determines whether the black level average value BAVE acquired in either S98 or S86 is between the error determination values EMAX and EMIN. If the black level average value BAVE is less than the error determination value EMAX and greater than the error determination value EMIN (S104:YES), the CPU 20 determines each set of data acquired in either S98 or S86 to be correct, and in S106 stores each set of data in the RAM 27 as reference data for the NA-th read condition similarly to S36.

After storing the reference data for the NA-th read condition in the RAM 27, in S108 the CPU 20 initializes the usage number U(NA). In S110, the CPU 20 sets the correction data retention flag for the NA-th read condition to ON, and ends the post process.

Meanwhile, if the acquisition flag for the NA-th read condition specified in the read command is OFF (S100:NO), or the correction data retention flag for the NA-th read condition is ON (S102:YES), or if the black level average value BAVE acquired in either S98 or S86 is greater than or equal to the error determination value EMAX or less than or equal to the error determination value EMIN (S104:NO), the CPU 20 ends the post process without storing, in the RAM 27, sets of data acquired in either S98 or S86. After ending the post process, the CPU 20 returns to the image reading process shown in FIG. 3, and repeats processes starting from S4.

4. Advantages of the Present Invention (1) According to the multifunction peripheral 1 of the embodiment, before the shading correction is executed on the original document image data in the read process, the CPU 20 determines whether or not the black level average value BAVE acquired in the read process matches, within the prescribed range, the reference black level average value BAVE stored in the RAM 27. Then, if the black level average value BAVE does match, within the prescribed range, the reference black level average value BAVE, the temperature of the light receiving part 15B in the read process is the same as the temperature of the light receiving part 15B when the reference black level average value BAVE was acquired, i.e. when the power-on process was performed. Accordingly, the shading correction is executed using the reference shading correction data stored in the RAM 27 linked to the reference black level average value BAVE. Here, the "prescribed range" signifies the range within which the temperature of the light receiving part 15B acquired when the read process is performed is considered to be the same as the temperature of the light receiving part 15B acquired when the reference black level average value BAVE was acquired, i.e. when power-on process was performed. In the embodiment, the values for the prescribed range are set based on the reference black level determination values BMAX and BMIN. However, the present invention is not limited thereto. For example, the prescribed range may be set by predetermined values.

If the black level average value BAVE acquired in the read process matches, within the prescribed range, the reference black level average value BAVE stored in the RAM 27, the shading correction is executed without executing the correction data acquisition process in the read process. As shown in FIG. 6, in the correction data acquisition process includes multiple types of processes, such as the AFE adjustment process and the light quantity adjustment process, and thus requires a relatively long period of time to execute. According to the multifunction peripheral 1 of the embodiment, in the case where the black level average value BAVE acquired in the read process matches, within the prescribed range, the reference black level average value BAVE, the shading correction can be executed without executing correction data acquisition process, thereby reducing the time period from the time that a read command is inputted by a user until the time that reading of the original sheet begins.

On the other hand, if the black level average value BAVE acquired in the read process does not match, within the prescribed range, the reference black level average values BAVE stored in the RAM 27, the temperature of the light receiving part 15B in the read process is different from the temperature of the light receiving part 15B in the power-on process. In this case, the correction data acquisition process is executed in the read process, and the shading correction is executed using the shading correction data acquired in the read process, thereby enabling the shading correction to be performed properly on the original document image data.

(2) According to the multifunction peripheral 1 of the embodiment, the reference data such as the reference shading correction data is acquired in the power-on process executed when power to the multifunction peripheral 1 is turned on. In general, when the multifunction peripheral 1 is turned on, inputting of operations to the multifunction peripheral 1 by users is prohibited, and the multifunction peripheral 1 thus cannot be used by users, until relatively high voltages such as that required to display information on the display unit 18 are stably generated. In this multifunction peripheral 1, the reference data is acquired when the multifunction peripheral 1 is turned on, that is, when inputting of operations to the multifunction peripheral 1 by users is prohibited. Accordingly, the reference data can be acquired using the period during which users cannot use the multifunction peripheral 1, and a negative impact on usability can thereby be avoided.

(3) According to the multifunction peripheral 1 of the embodiment, the reference data is acquired during the power-on process for only three read conditions. Here, these three read conditions are specified most frequently in the read commands by users. This configuration can prevent the time required to perform the power-on process from being extended, that is, the power-on process from continuing even after the inputting of operations to the multifunction peripheral 1 by users would have been possible. In other words, the configuration of the embodiment can prevent the period of time during which users are practically unable to use the multifunction peripheral 1 from being extended.

(4) According to the multifunction peripheral 1 of the embodiment, the usage number U indicating the number of times that the reference shading correction data stored in the RAM 27 has been used is limited. As a result, the shading correction data can be periodically updated in conjunction with long-term degradation of the light emitting part 15A, and the shading correction can be performed appropriately on the original document image data.

(5) According to the multifunction peripheral 1 of the embodiment, when the sets of data acquired during the correction data acquisition process are stored in the RAM 27, the black level average value BAVE contained in this data is compared to the error determination values EMAX and EMIN, and if specific conditions are satisfied, these sets of data are stored in the RAM 27. This configuration can prevent data that has not been acquired properly due to effects of, for example, external light or damage to light receiving elements, from being stored in the RAM 27 as reference data.

Second Embodiment

A second embodiment of the present invention will be explained referring to FIGS. 11-14. In the second embodiment, a read process and a correction data acquisition process during the read process are different from those in the first embodiment. The following description will focus on points of difference from the first embodiment, wherein like parts and components are designated with the same reference numerals to avoid duplicating description.

1. Read Process

Figure 11:
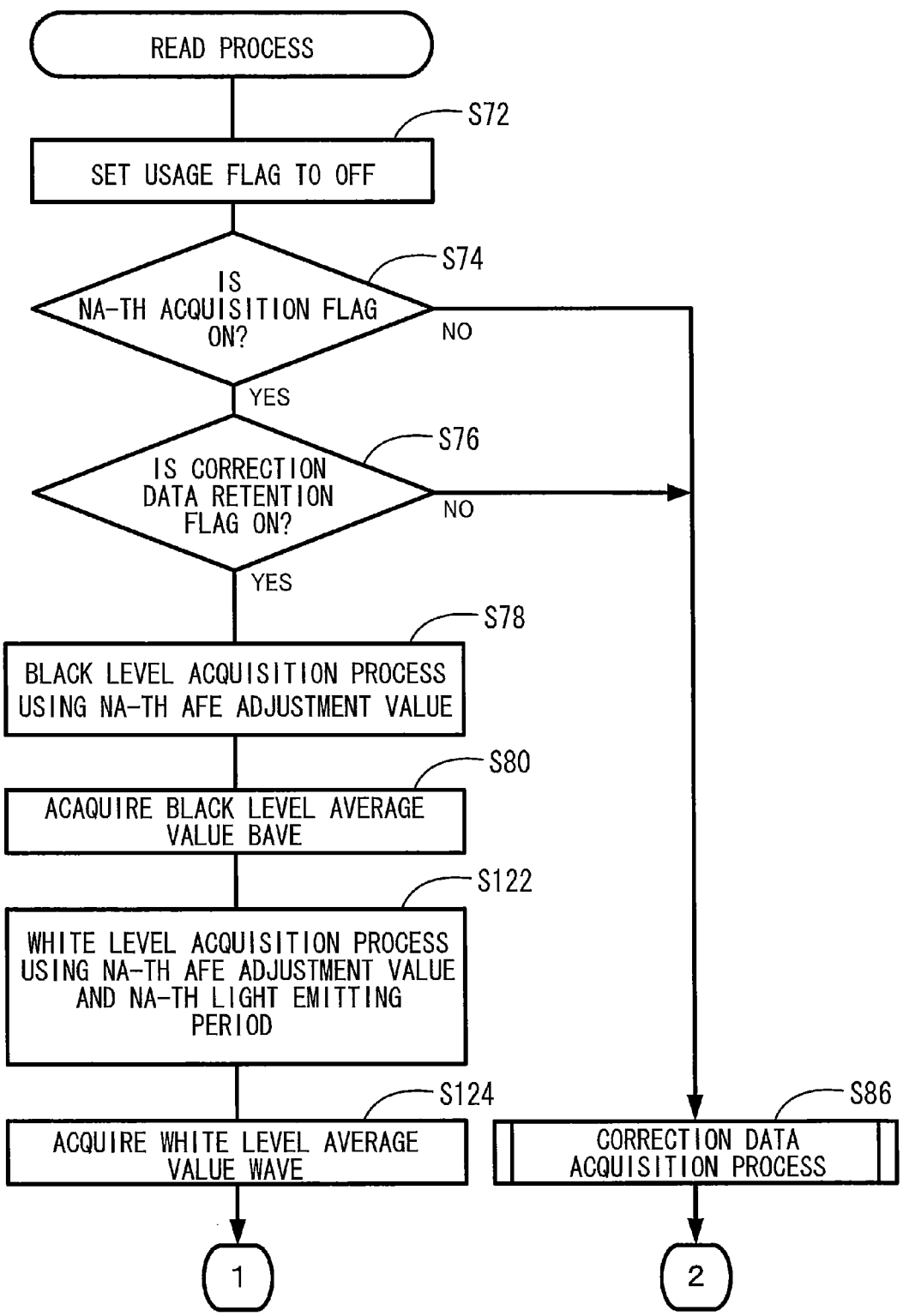
FIG. 11 is a flowchart illustrating a part of a read process according to a second embodiment.
Figure 12:
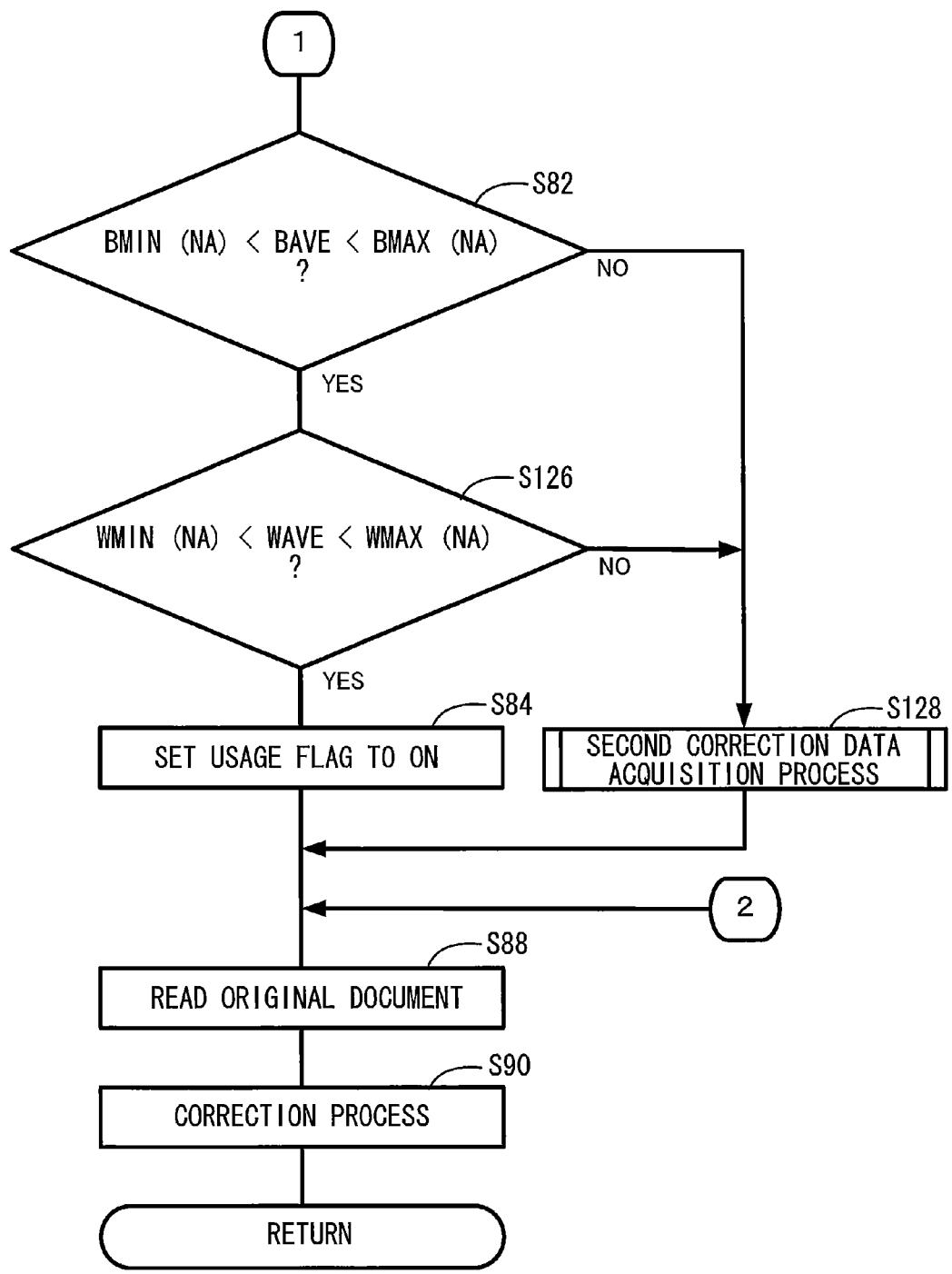
FIG. 12 is a flowchart illustrating a remaining part of the read process according to the second embodiment.

In the image reading process shown in FIG. 3, when a read command is inputted by a user (S4:YES), the CPU 20 executes a read process. As shown in FIGS. 11 and 12, in S78 the CPU 20 executes a black level acquisition process, and in S80 acquires the black level average value BAVE from the acquired black level data. In S122, the CPU 20 executes a white level acquisition process for acquiring white level data by using reference AFE adjustment values stored in the RAM 27 linked to the NA-th read condition, along with a light emitting period. In S124, the CPU 20 acquires the white level average value WAVE obtained from the white level data. The processes in S122 and S124 is the same as the processing in S60 and S70, respectively, so explanations are omitted.

After the CPU 20 acquires the black level average value BAVE and the white level average value WAVE, in S82 the CPU 20 determines whether the acquired black level average value BAVE matches, within the prescribed range, the reference black level average value BAVE stored in the RAM 27. Further, S84 the CPU 20 determines whether the acquired white level average value WAVE matches, within a prescribed range, the reference white level average value WAVE stored in the RAM 27. In other words, the CPU 20 determines whether the white level average value WAVE is between the reference white level determination values WMAX and WMIN. That is, the CPU 20 determines whether the white level average value WAVE is a range from the value WMIN to the value WMIN. Here, the reference black level average value WAVE falls in this range.

The white level data acquired from the white level acquisition process changed due to the aged deterioration of the light emitting part 15A. For this reason, if the white level average value WAVE acquired in S124 does not match, within the prescribed range, the reference white level average value WAVE stored in the RAM 27, it will not be possible to properly correct the read data by executing the shading correction using the reference shading correction data stored in the RAM 27 linked to the reference white level average value WAVE. In the second embodiment, prior to the correction process (S90) in which the shading correction is executed, the CPU 20 determines whether or not the white level average value WAVE acquired in S124 matches, within the prescribed range, the reference white level average value WAVE stored in the RAM 27. More specifically, the CPU 20 compares the white level average value WAVE acquired in S124 with the reference white level determination values WMAX and WMIN.

If the black level average value BAVE acquired in S80 is less than the reference black level determination value BMAX and greater than the reference black level determination value BMIN (S82:YES), in S84 the CPU 20 determines that the black level average value BAVE acquired in S80 matches, within the prescribed range, the reference black level average value BAVE stored in the RAM 27. Further, if the white level average value WAVE acquired in S124 is less than the reference white level determination value WMAX and greater than the white level determination value WMIN (S126:YES), in S84 the CPU 20 determines that the white level average value WAVE acquired in S124 matches, within the prescribed range, the reference black level average value WAVE stored in the RAM 27. In S84 the CPU 20 switches the usage flag to ON when the black level average value BAVE acquired in S80 matches, within the prescribed range, the reference black level average value BAVE stored in the RAM 27, and the white level average value WAVE acquired in S124 matches, within the prescribed range, the reference black level average value WAVE stored in the RAM 27.

If the acquisition flag for the NA-th read condition specified in the read command is OFF (S74:NO), or if the correction data retention flag for the NA-th read condition is OFF (S76:NO), in S86 the CPU 20 executes the correction data acquisition process.

If the black level average value BAVE acquired in S80 is greater than or equal to the reference black level determination value BMAX or is less than or equal to the reference black level determination value BMIN (S82:NO), or if the white level average value WAVE acquired in S126 is greater than or equal to the reference white level determination value WMAX or is less than or equal to the reference white level determination value WMIN (S126:NO), in S128 the CPU 20 executes a second correction data acquisition process.

(Second Correction Data Acquisition)

Figure 9:
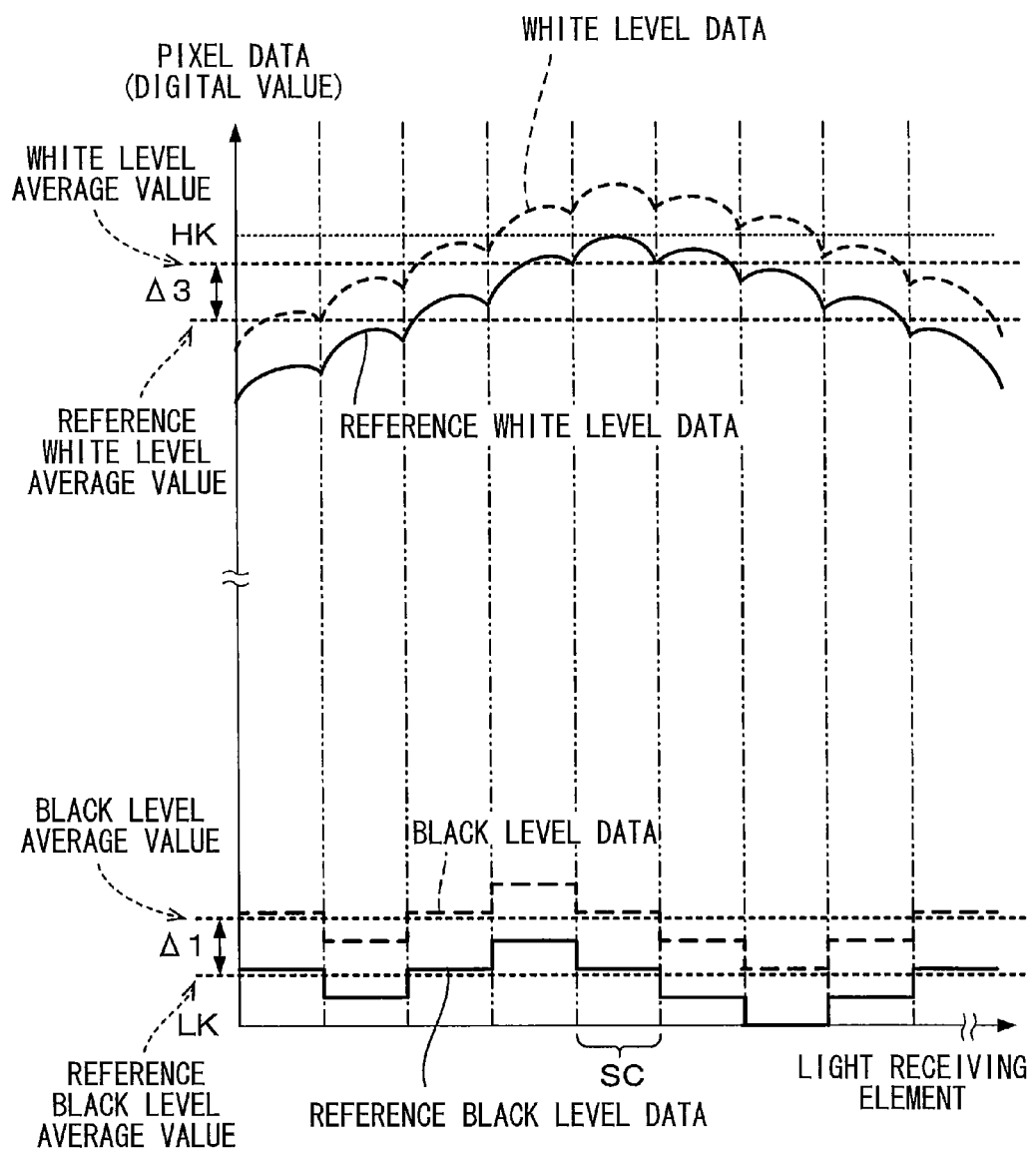
FIG. 9 is a graph showing a white level data and a black level data for each light receiving elements.
Figure 13:
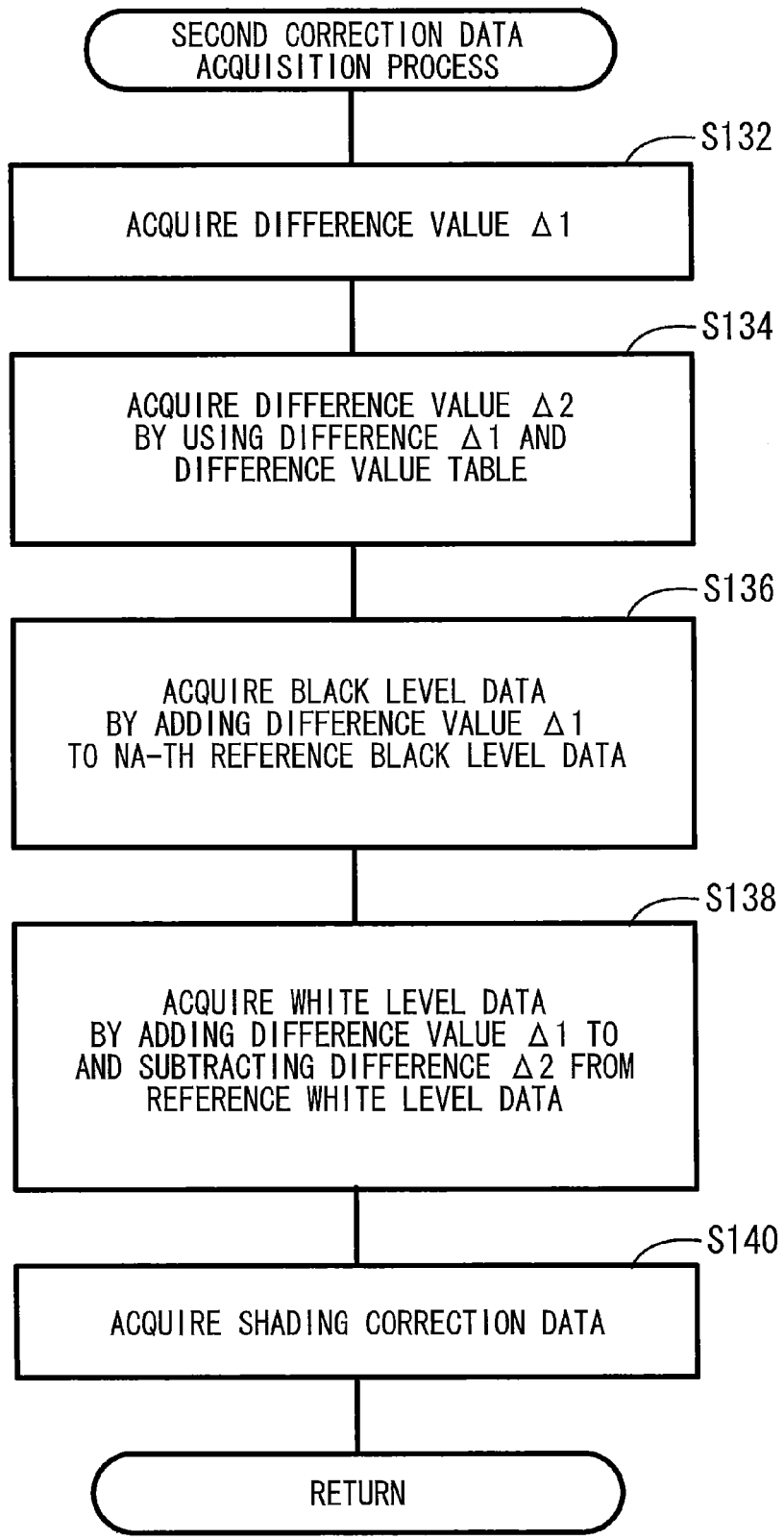
FIG. 13 is a flowchart illustrating a second correction data acquisition process according to the second embodiment.

As shown in FIG. 13, in S132 of the second correction data acquisition process, the CPU 20 acquires a difference value $\Delta 1$ between the black level average value BAVE acquired in S80 and the reference black level average value BWAVE stored in the RAM 27 (see the dotted and dashed lines in the lower section of FIG. 9). The difference value table H, in which the difference value $\Delta 1$ and a difference value $\Delta 2$ are linked, is stored in the ROM 26. After calculating the difference value $\Delta 1$, in S134 the CPU 20 reads the difference value table H from the ROM 26 and acquires the difference value $\Delta 2$ by selecting the difference $\Delta 3$ from the difference value table H. The difference value $\Delta 1$ is an example of a difference.

As explained above, the difference value $\Delta 1$ comes from the difference between the temperature of the light receiving part 15B during the read process and the temperature of the light receiving part 15B during the power-on process. As shown in FIG. 10, if the temperature of the light receiving part 15B during power-on process is 25° C., and the temperature of the light receiving part 15B 15 during the read process is 35° C., the difference value $\Delta 1$ is 10.

When there is the difference value $\Delta 1$ between the black level average value BAVE acquired in S80 and the reference black level average value BWAVE, there is also a difference value $\Delta 3$ between the white level average value WAVE acquired in S124 and the reference white level average value WAVE (see the dotted and dashed lines in an upper section of FIG. 9). As shown in FIG. 14, the difference value $\Delta 1$ and the difference value $\Delta 3$ are not the same; the absolute value of the difference value $\Delta 3$ is smaller than that absolute value of the difference value $\Delta 1$. The difference value $\Delta 2$ described above indicates the difference between the difference value $\Delta 3$ and the difference value $\Delta 1$, and is represented by the formula shown below. For example, if the temperature of the light receiving part 15B during the power-on process is 25° C., and the temperature of the light receiving part 15B during the read process is 35° C., the difference value $\Delta 1$ is 10, and the difference value $\Delta 3$ is 8, so the difference value $\Delta 2$ is −2. The difference value $\Delta 3$ is an example of a difference estimation value and, since the difference value $\Delta 3$ can be obtained from the difference value $\Delta 2$, the difference value $\Delta 2$ is another example of a difference estimation value. $\Delta 2 = \Delta 3 - \Delta 1$ After acquiring the difference value $\Delta 1$ and the difference value $\Delta 2$, the CPU 20 uses the reference black level data and the reference white level data stored in the RAM 27 linked to the NA-th read condition to acquire black level data and white level data for the shading correction data acquisition process. Specifically, in S136 the CPU 20 acquires the black level data for the shading correction data acquisition process by adding the difference value Δ1 to the reference black level data stored in the RAM 27 linked to the NA-th read condition.

In addition, in S138 the CPU 20 acquires the white level data for the shading correction data acquisition process by adding the difference value Δ1 to, and subtracting the difference value Δ2 from, the reference black level data stored in the RAM 27 linked to the NA-th read condition. In S140, the CPU 20 acquires shading correction data based on known methods by using the black level data acquired in S136 and the white level data acquired in S138, and ends the second correction data acquisition process.

After ending the second correction data acquisition process, the CPU 20 returns to the read process shown in FIG. 12. In S88 the CPU 20 reads the original document, and in S90 performs the correction process. If the usage flag is ON, the CPU 20 executes the shading correction using the reference shading correction data stored in the RAM 27. Meanwhile, if the usage flag is OFF, and the correction data retention flag is OFF, the CPU 20 executes the shading correction using the shading correction data acquired in the correction data acquisition process of S86. On the other hand, if the usage flag is OFF, and the correction data retention flag is ON, the CPU 20 executes the shading correction using the shading correction data acquired in the second correction data acquisition process of S128.

2. Advantages of the Present Invention (1) According to the multifunction peripheral 1 of the second embodiment, before the shading correction is executed on the original document image data in the read process, the CPU 20 determines whether or not the black level average value BAVE acquired in the read process matches, within the prescribed range, the reference black level average value BAVE stored in the RAM 27, and further determines whether or not the white level average value WAVE acquired in the read process matches, within the prescribed range, the reference white level average value WAVE stored in the RAM 27. If the white level average value WAVE acquired in the read process does not match, within the prescribed range, the reference white level average value WAVE, the light emitting part 15A is deteriorated from the light emitting element of the light emitting part 15A when the power on process is performed. In this case, the second correction data acquisition process is executed in the read process, and the shading correction is executed using the shading correction data acquired in the read process, thereby enabling the shading correction to be performed properly on the original document image data.

(2) According to the multifunction peripheral 1 of the second embodiment, when acquiring the shading correction data in the read process, if the reference black level data and the reference white level data are stored in the RAM 27, these values are used to acquire the black level data and the white level data for acquiring the shading correction data, and processes such as the AFE adjustment process and the light quantity adjustment process is not executed. As a result, the time period from the time that a read command is inputted by a user until the time that reading of the original sheet begins can be shortened.

(3) According to the multifunction peripheral 1 of the second embodiment, when acquiring the white level data to acquire the shading correction data from the reference white level data, the difference value Δ2 is found from the difference value Δ1 and the difference value table H, and then the white level data to acquire the shading correction data is acquired. As a result, acquiring the white level data to acquire the shading correction data is easier than if the white level data to acquire the shading correction data were acquired based on the difference value Δ3 between the reference white level average value WAVE and the white level average value WAVE acquired in the read process.

(4) In the second embodiment, the white level average value WAVE is compared with the reference white level average value stored in in the RAM 27, and the correction data is selected based on this determination, the correction data can be selected by considering the aged deterioration of the light emitting part 15A.

<Modifications>

While the invention has been described in detail with reference to the embodiments thereof, it would be apparent to those skilled in the art that various changes and modifications may be made therein without departing from the scope of the invention.

(1) In the above embodiments, the multifunction peripheral 1 has a plurality of functions including a scanner function, the copier function, and the printing function. However, the multifunction peripheral 1 does not limited thereto. For example, the multifunction peripheral 1 may have only a scanner function.

(2) In the above embodiments, the multifunction peripheral 1 has the ACIS 29 including the CPU 20. The control section 21 is configured such that the CPU 20 performs various process, such as the image reading process by using the hardware circuit in the ASIC 29 if needed. However, the present invention is not limited thereto. For example, the CPU 20 may be provided separately from the ASIC 29, and the CPU 20 may execute the processes that the control section 21 handles. Or, the ASIC 29 may not include the CPU 20, and the hardware in the ASIC 29 may execute the processes that the control section 21 handles. Alternatively, one or plurality of CPUs, or one or plurality of ASICs may execute the processes that the control section 21 handles.

(3) The programs executed by the CPU 20 is not stored in the ROM 26, but may be stored in the CPU 20 or other storing devices.

(4) According to the embodiments described above, explanations were presented using examples in which the light emitting period of the light emitting part 15A is adjusted in the light quantity adjustment process. However, the present invention is not limited to such configurations. For example, the amount of electrical current supplied to the light emitting part 15A may be adjusted in the light quantity adjustment process. Or, both the light emitting period and the amount of electrical current may be adjusted in the light quantity adjustment process.

(5) According to the embodiments described above, explanations were presented using examples in which there were three read conditions for which reference data is to be acquired during the power-on process. However, the present invention is not limited to such configurations. Further, in the above embodiments, the read conditions for which reference data is to be acquired during the power-on process is the read conditions most frequently selected by users. However, read conditions for which reference data is to be acquired during the power-on process may alternatively be selected based on other criteria, such as the amount of time that the read conditions require to process.

What is claimed is:

1. An image reading device comprising:
a reading unit configured to output image data by reading an original document, the reading unit having a light source and a light receiving unit, the light source being configured to emit light, the light receiving unit being configured to receive light;

a command receiving unit configured to receive an instruction to control the reading unit to read the original document;

a storing device preliminarily storing reference dark output data and reference correction data assigned with the reference dark output data, the reference dark output data being generated based on read dark data outputted from the light receiving unit while the light source does not emit light;

a reference member; and a control device, after the command receiving unit receives the instruction, configured to:

generate dark output data based on read data outputted from the light receiving unit while the light source does not emit light; and determine whether the dark output data is within a first prescribed range into which the reference dark output data falls, wherein when determining that the dark output data is within the first prescribed range, the control device is further configured to:

generate the image data by using the reading unit; and correct the generated image data by using the reference correction data preliminarily stored in the storing device, wherein when determining that the dark output data is not within the first prescribed range, the control device is further configured to:

generate light output data based on read light data obtained from the light receiving unit by reading the reference member while the light source emits light;

generate new correction data based on the generated dark output data and the generated light output data;

generate the image data; and correct the generated image data by using the newly generated correction data.

2. An image reading device comprising:

a reading unit configured to output image data by reading an original document, the reading unit having a light source and a light receiving unit, the light source being configured to emit light, the light receiving unit being configured to receive light;

a command receiving unit configured to receive an instruction to control the reading unit to read the original document;

a storing device storing reference dark output data and reference correction data assigned with the reference dark output data, the reference dark output data being generated based on read dark data outputted from the light receiving unit while the light source does not emit light; and a control device, after the command receiving unit receives the instruction, configured to:

generate dark output data based on read data outputted from the light receiving unit while the light source does not emit light determine whether the dark output data is within a first prescribed range into which the reference dark output data falls;

select the reference correction data as selected correction data, when determining that the dark output data is within the first prescribed range;

generate correction data to correct the image data when determining that the dark output data is not within the first prescribed range, and select, in place of the reference correction data, the generated correction data as the selected correction data;

generate the image data by using the reading unit; and correct the image data by using the selected correction data, wherein while the correction data is generated, the control device is configured to generate the correction data by adding a difference between the dark output data and the reference dark output data to the reference correction data, wherein the storing unit further stores, in association with the difference, an estimated difference between light output data and reference light output data, the light output data being generated based on read light data obtained from the light receiving unit while the light source emits light, wherein while the correction data is generated, the control device is configured to modify the reference correction data by adding at least one of the difference and the estimated difference to the reference correction data, or by subtracting at least one of the difference and the estimated difference from the reference correction data.

3. The image reading device according to claim 1, further comprising a reference member, wherein the storing unit further stores reference light output data in association with the reference dark output data, the reference light output data being generated based on read light data obtained from the light receiving unit by reading the reference member while the light source emits light, wherein the control device, after receiving the instruction to control the reading unit is further configured to determine whether the light output data is within a second prescribed range into which the reference light output data falls, wherein the control device is configured to correct the image data by using the reference correction data when the control device determines that the dark output data is within the first prescribed range and that the light output data is within the second prescribed range, wherein the control device is configured to generate new correction data to correct the image data and correct the image data by using the newly generated correction data when the control device determines that the dark output data is not within the first prescribed range or that the light output data is not within the second prescribed range.

4. The image reading device according to claim 1, wherein when the control device is booted up, the control device generates the dark output data and the correction data, wherein the control device stores, as the reference dark output data generated when the control device is booted up, and stores, as the reference correction data, the correction data generated when the control device is booted up.

5. The image reading device according to claim 4, further comprising a condition receiving unit configured to receive a reading condition from among a plurality of reading conditions, wherein the storing unit stores both the reference dark output data and the reference correction data in association with a specific reading condition, wherein when the control device is booted up, the control device is further configured to:

receive the reading condition by using the condition receiving unit;

generate, when the received reading condition is a specific condition, the dark output data; and generate correction data to correct the image data based on the generated dark output data.

6. The image reading device according to claim 4, wherein the storing unit stores selection number indicating number of times that the reference correction data is used to correct the image data, wherein the control device is further configured to:

increment the selection number when the image data is corrected by using the reference correction data; and compare the selection number with a prescribed value, wherein when the selection number is less than the prescribed value, the control device maintains the reference dark output data and the reference correction data stored in the storing unit, wherein the selection number is greater than or equal to the prescribed value, the control device: generates the dark output data; generates the correction data; stores the generated dark output data as the reference dark output data; and stores the generated correction data as reference correction data.

7. The image reading device according to claim 4, wherein when the control device is booted up, the control device is further configured to:

determine that the generated dark output data has an error; and store, when the dark output data does not have the error, the dark output data generated when the control device is booted up as the reference dark output data, and the correction data generated when the control device is booted up as the reference correction data.

* * * * *